US005765120A

United States Patent [19]

Tan et al.

[11] Patent Number: 5,765,120

[45] Date of Patent: Jun. 9, 1998

[54] DETECTING DEVICE FOR FUEL-INJECTING INTERVAL OF ENGINE

[75] Inventors: Po-Chao Tan, Taipei; Yoeng-Jor Wang, Tai Nan Hsien; Shian-Chang Shaio, Taipei Hsien, all of Taiwan

[73] Assignee: Brymen Technology Corporation, Chung Ho, Taiwan

[21] Appl. No.: 794,886

[22] Filed: Feb. 5, 1997

[51] Int. Cl.$^6$ .................................................. G01M 15/00

[52] U.S. Cl. .......................................... 701/103; 73/119 A

[58] Field of Search .................................. 73/116, 117.2, 73/117.3, 118.1, 119 A; 364/431.051, 431.052, 431.053; 701/103, 104, 105

[56] References Cited

U.S. PATENT DOCUMENTS

| | | | |
|---|---|---|---|
| 4,576,129 | 3/1986 | Wallenfang et al. | 73/119 A |
| 4,791,809 | 12/1988 | Schmidt | 73/119 A |
| 5,116,342 | 5/1992 | Schmidt et al. | 73/119 A |
| 5,433,109 | 7/1995 | Mayer-Dick et al. | 73/119 A |

*Primary Examiner*—George M. Dombroske
*Attorney, Agent, or Firm*—Morton J. Rosenberg; David I. Klein; Jun Y. Lee

[57] ABSTRACT

A detecting device for fuel injecting interval is provided, more particularly, to a portable and digital detecting device for detecting the fuel injecting interval of the injector of engine. The detecting device comprises a level transformer, a signal delay filter, a digital signal processor, and a display. The input of the level transformer 2 is electrical connected to the output load terminal of the controller 1 of the injector of engine in a way of inverse measure. The high frequency noise in the target waveform is filtered by the signal delay filter. The delay time within the detecting device is calculated by the digital signal processor and is subtracted. The resulted and exact fuel injecting interval is illustrated in the display. The detecting device features a compact configuration, easy to maintain and low service cost. Most important, the detecting device features a lower measuring error level.

2 Claims, 11 Drawing Sheets

(-) MULTI-POINTS SINGLE WAVE INJECTING:

(=) THROTTLE SINGLE-POINT INJECTING:

(三) MULTI-POINTS COMPLEX-WAVEFORM INJECTING:

(3)

(4)

(1)

(2)

(3)

(4)

DETECTING DEVICE FOR FUEL-INJECTING INTERVAL OF ENGINE

FIELD OF THE INVENTION

The present invention relates to a detecting device, more particularly, to a detecting device for fuel injecting interval. This portable and digital detecting device can be readily used for detecting the fuel injecting interval. With this compact configuration of the detecting device, the measuring error can be reduced lo lowest level. The printed circuit board space required is also reduced while it can be readily maintenance with a comparable cost.

DESCRIPTION OF PRIOR ART

The fuel injecting mode controlled by microcomputer can be categorized into three types and four patterns. The waveforms are shown in FIG. 1, wherein the t is the fuel injecting interval. Nevertheless, when a bulky and complicated instrument, such as a oscilloscope, is applied to detect whese kinds of waveforms, the cost is expensive and the oscilloscope is bulky for handling. On the other hand, the existed portable and digital detecting device applies a counter mode to calculate the fuel injecting interval of within the waveform. Since the counter type is a edge trigger type, only waveform 1 can be detected. When it is used to detect waveforms 2, 3 and 4, error will be introduced.

In the conventional detecting circuit, as shown in FIG. 2, a Phase locked loop is applied to generate a corresponding control waveform 05 and compare this control waveform 05 with the target waveform to be detected. This control waveform 05 is modified and revised till it is conformed to the target waveform to be detected. Afterward, the common counter mode is applied to calculate the fuel injecting interval from the target waveform. However, this Phase locked loop is bulky, relatively complicated and cost high. Also, the precision required for the components used are quite high. Only when these requirements are met, a stable and correct corresponding control waveform 05 can be generated.

SUMMARY OF THE INVENTION

It is the objective of this invention to solve the problems encountered by the conventional detecting device.

It is the objective of this invention to provide a compact and portable detecting device for fuel injecting interval wherein this detecting device is easy for maintenance, and with lower service cost. The fuel injecting interval of engine can be readily and accurately detected.

In order to achieve the objective set forth, the detecting device is provided with a level transformer which is electrically connected to the output load terminal of the controller of the injector of engine by a waveform, inverse measure. Then the high frequency signal within the target signal is filtered by a signal delay filter. Afterward, the delay time is calculated and subtracted by the digital signal processor and the correct and accurate fuel injecting interval is displayed on the display.

BRIEF DESCRIPTION OF THE DRAWINGS

In order that the present invention may more readily be understood the following description is given, merely by way of example with reference to the accompanying drawings, in which:

FIG. 1 is the waveform in different fuel injecting modes.

BRIEF DESCRIPTION OF NUMERALS

Figure 1A:
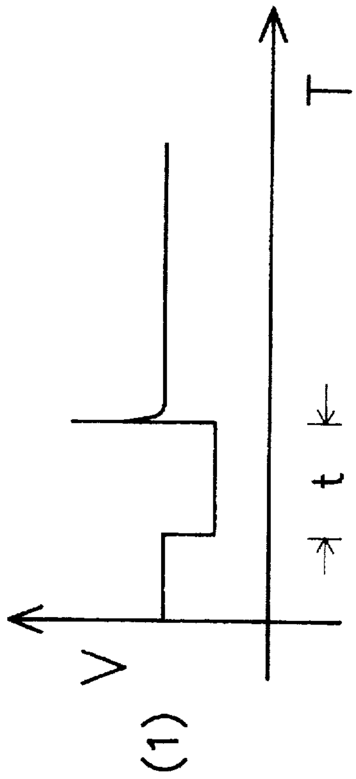
FIG. 1A is a multi-points single wave injecting.
Figure 1B:
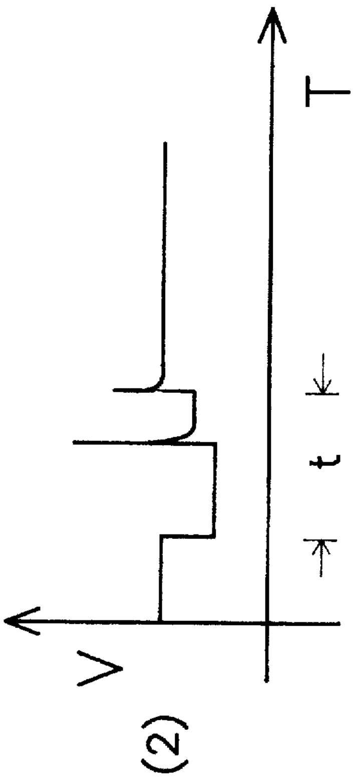
FIG. 1B is throttle single-point injecting.
Figure 1C:
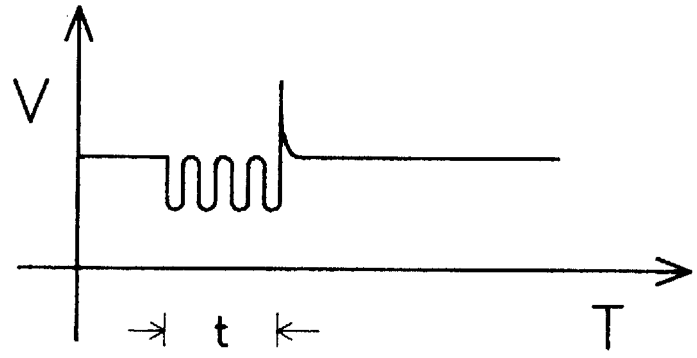
FIGS. 1C and 1D are multi-points complex-waveform injecting.
Figure 1D:
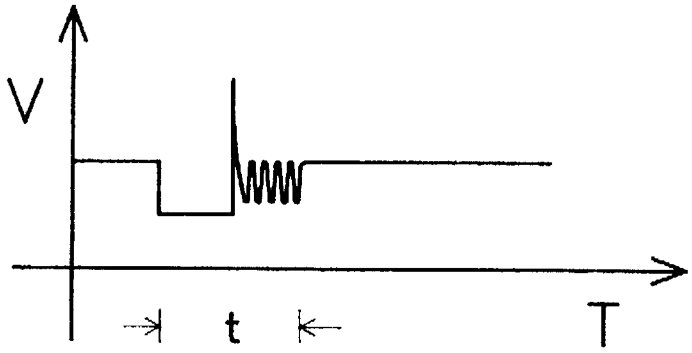
Figure 2:
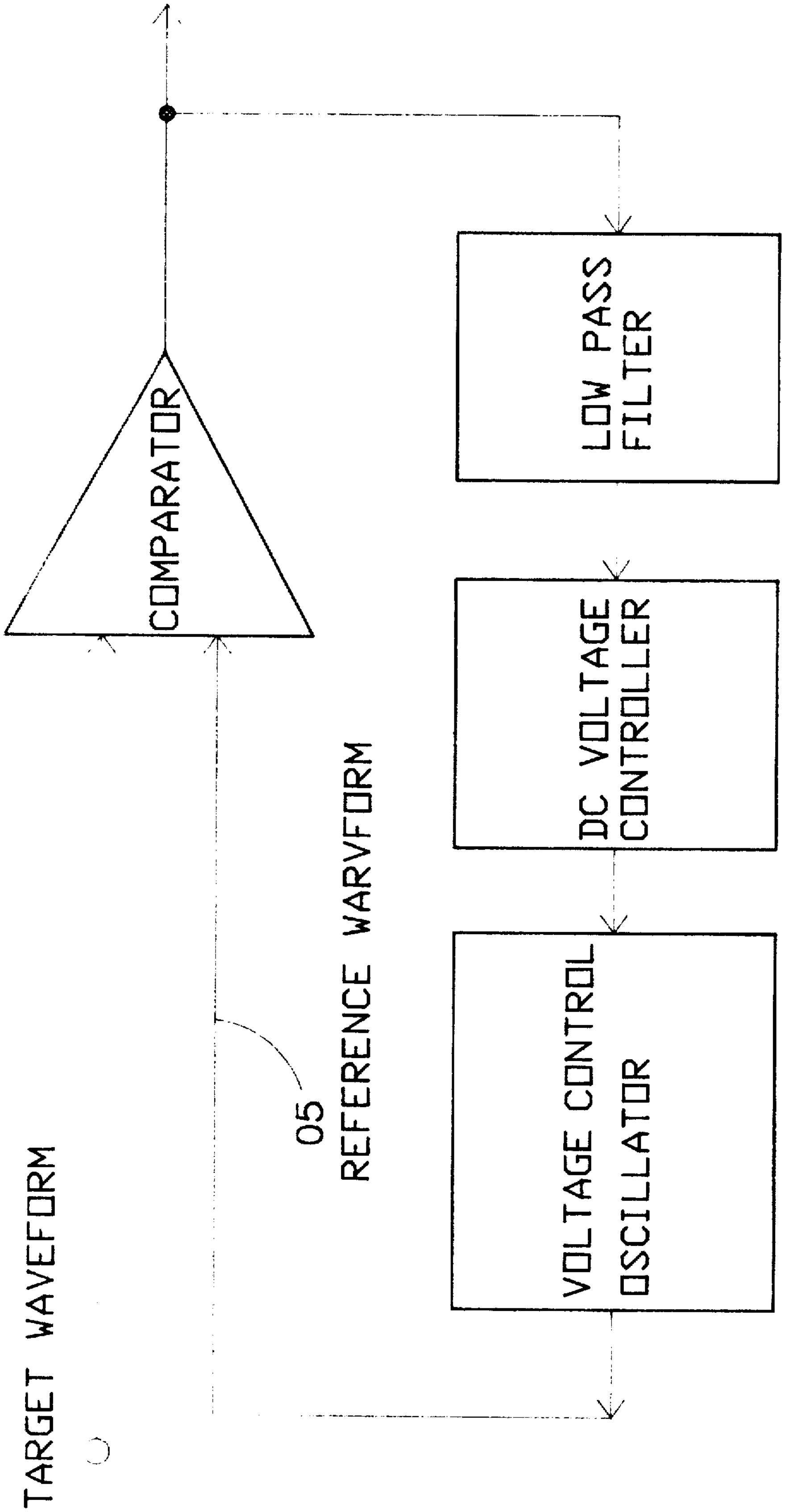
FIG. 2 is a block diagram of Phase locked loop.

01–05 A0, BA waveform
1 controller
2 level transformer
3 signal delay filter 31, 32 invertor
4 digital signal processor
5 display

DETAILED DESCRIPTION OF PREFERRED EMBODIMENT

Figure 3:
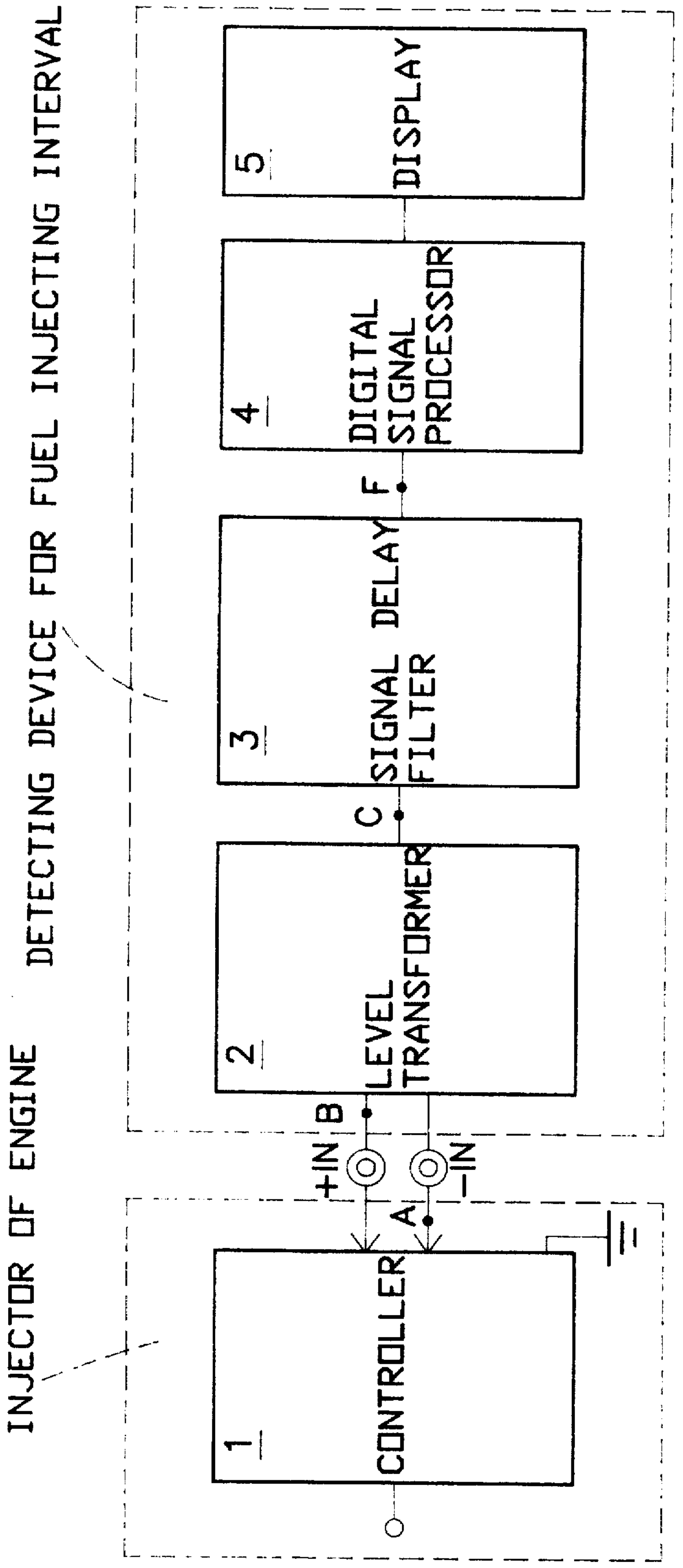
FIG. 3 is a block diagram showing the interconnection between the detecting device made according to this invention and injector of engine.

Referring to FIG. 3, the controller 1 for controlling the actuation of the injector of the engine and the detecting device made according to this invention comprises a level transformer 2, a signal delay filter 3, a digital signal processor 4, and a display 5. The input of the level transformer 2 is electrically connected to the output load terminal of the controller 1 of the injector of engine. The output terminal fo the level transformer 2 is connected to the input of the signal delay filter 3. The output terminal of the signal delay filter 3 is connected to the input terminal of the digital signal processor 4 and the output terminal of the digital signal processor 4 is connected to the input terminal of the display 5.

Figure 4:
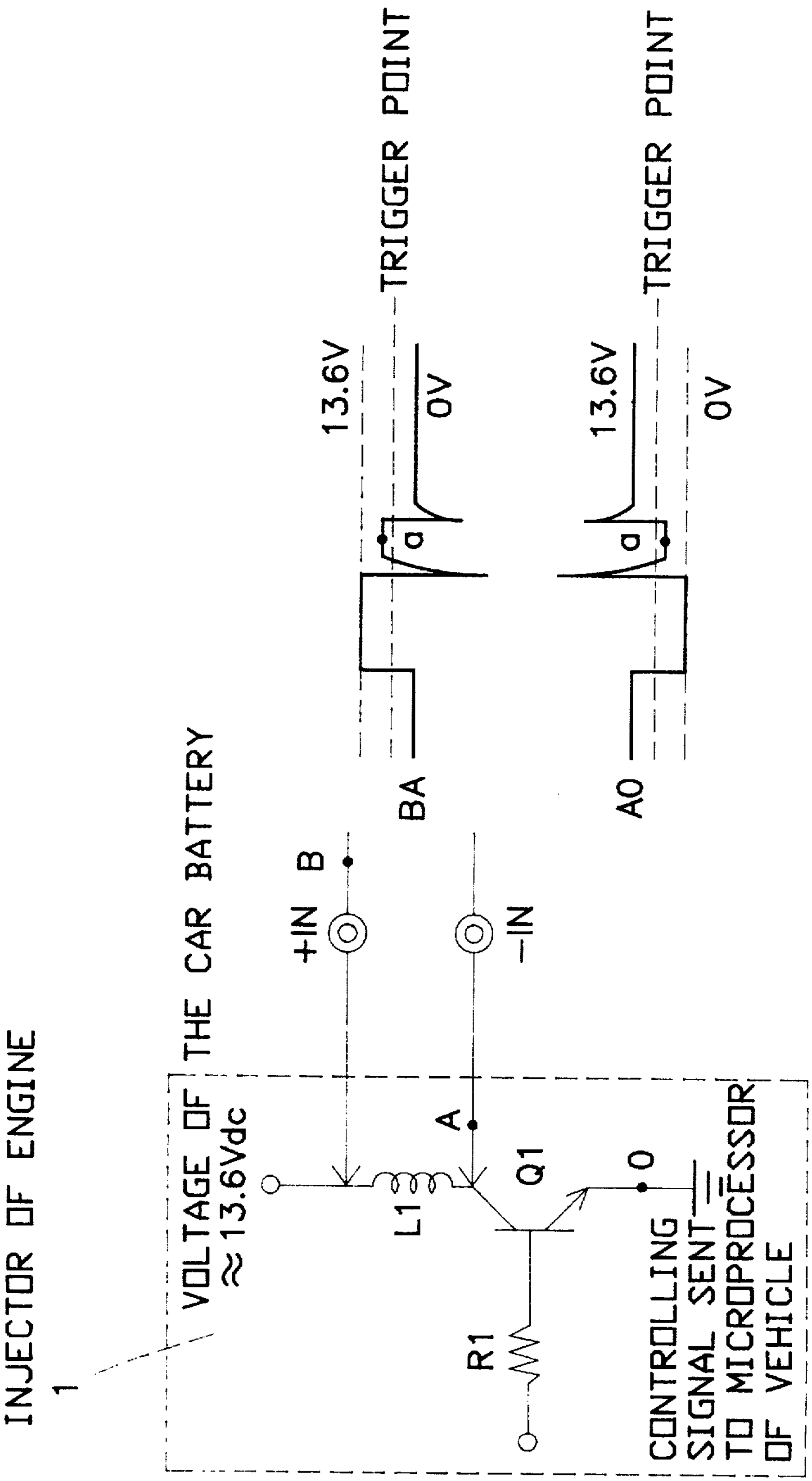
FIG. 4 is an equivalent circuit and the associated waveform of the controller of the injector of the engine.

FIG. 4 discloses an equivalent circuit for the controller 1. The relative signal between the collecting A point and earth of the transistor 01 is waveform A0. The trigger point of the waveform A0 is the level determining point of the level transformer 2 disposed at downstream. The voltage level of car battery is not fixed to 13.6 Volt. If the earth 0 point is set for reference level of the trigger point, then the "a" point of the waveform A0 will be shifted to the trigger point or above the trigger point. Accordingly, the level determination of the level transformer 2 is incorrect.

When the input terminal of the level transformer 2 is connected to the BA point disposed at both ends of the output load (the inductor L1 is the solenoid switch of the fuel injector), then the voltage of the car battery can be set as the reference level of the trigger point. As illustrated by waveform BA, when the voltage of the car battery is varied and a potential differential can be maintained without being effected between the point "a" and trigger point. Consequently, the level transformer 2 may operate functionally to perform the level determination which in turn can be transformed into a waveform for secondary circuit processing. The measurement described above can be referred to as an inverse measure.

Figure 5:
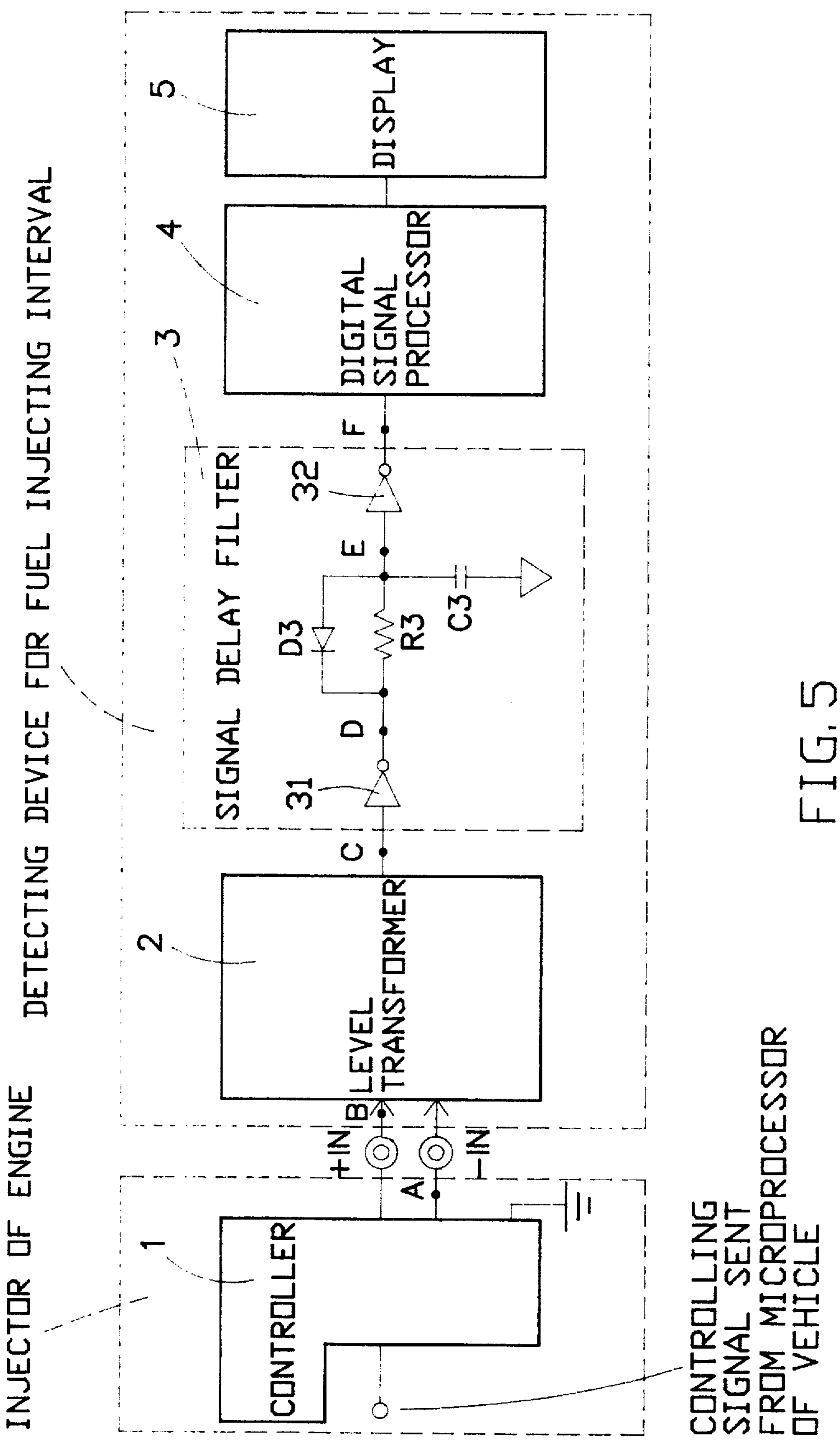
FIG. 5 is a block diagram of the detecting device made according to this invention.
Figure 6:
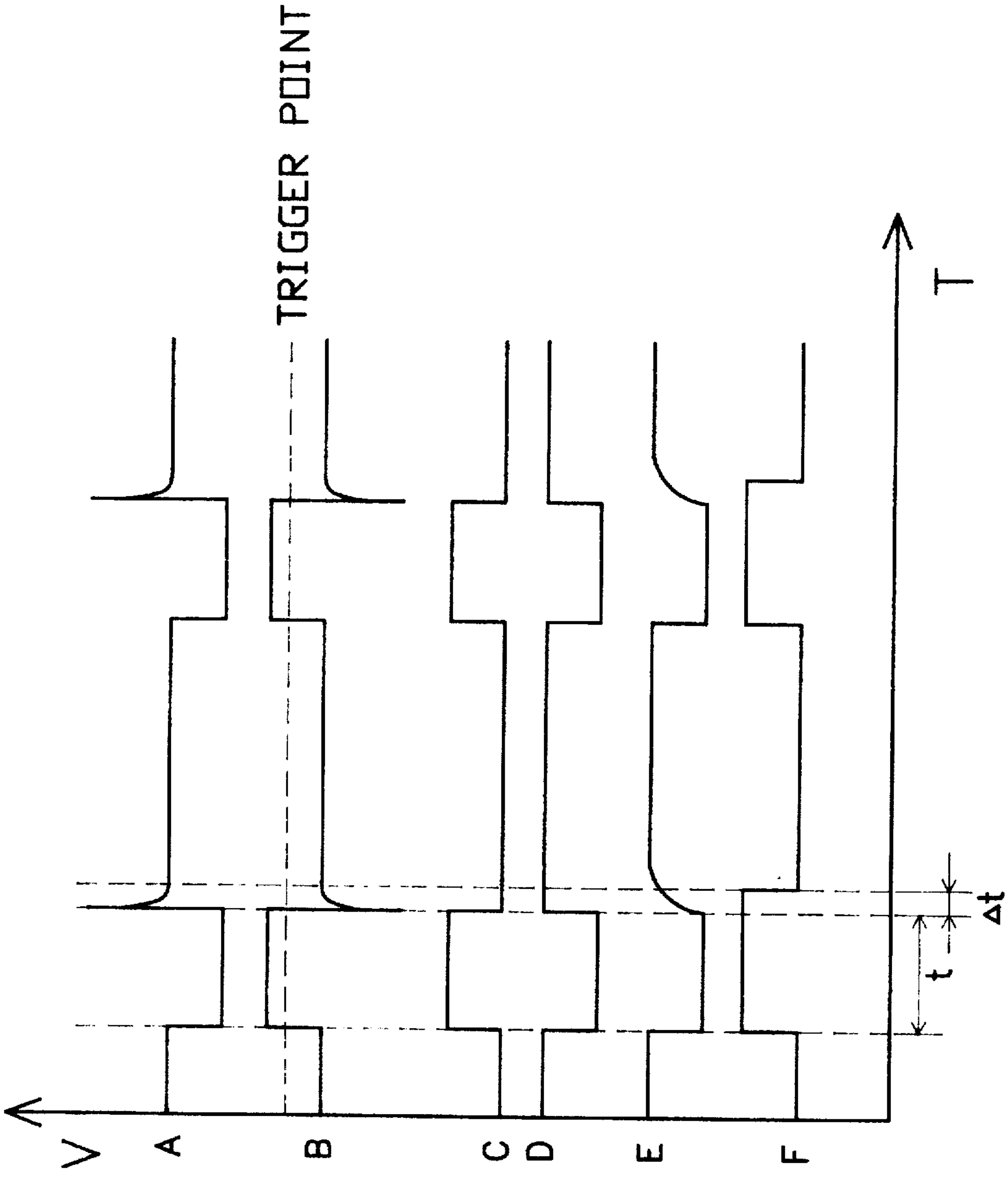
FIG. 6 is the first pattern of fuel injecting of each waveform in FIG. 5.
Figure 7:
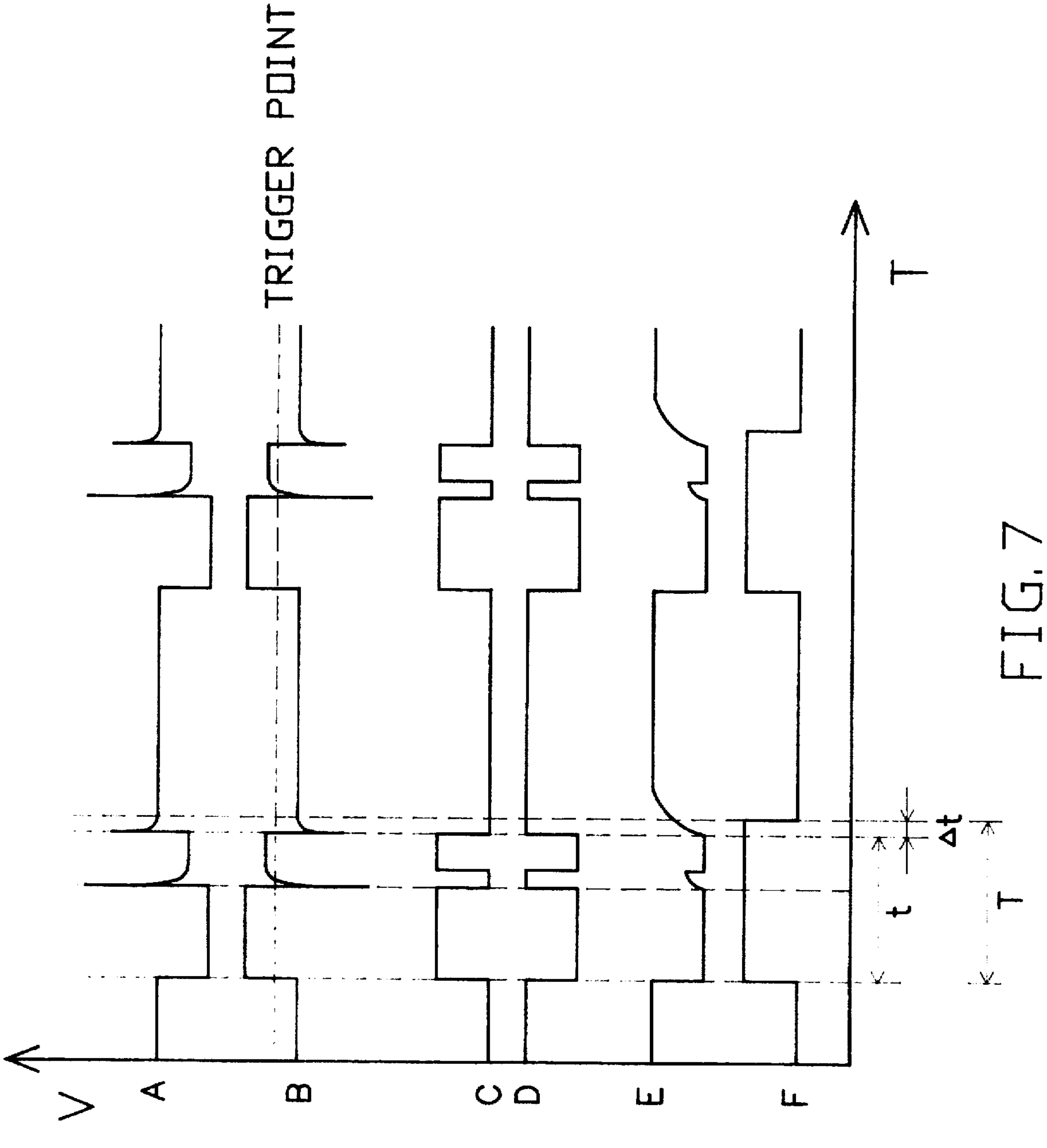
FIG. 7 is the second pattern of fuel injecting of each waveform in FIG. 5.
Figure 8:
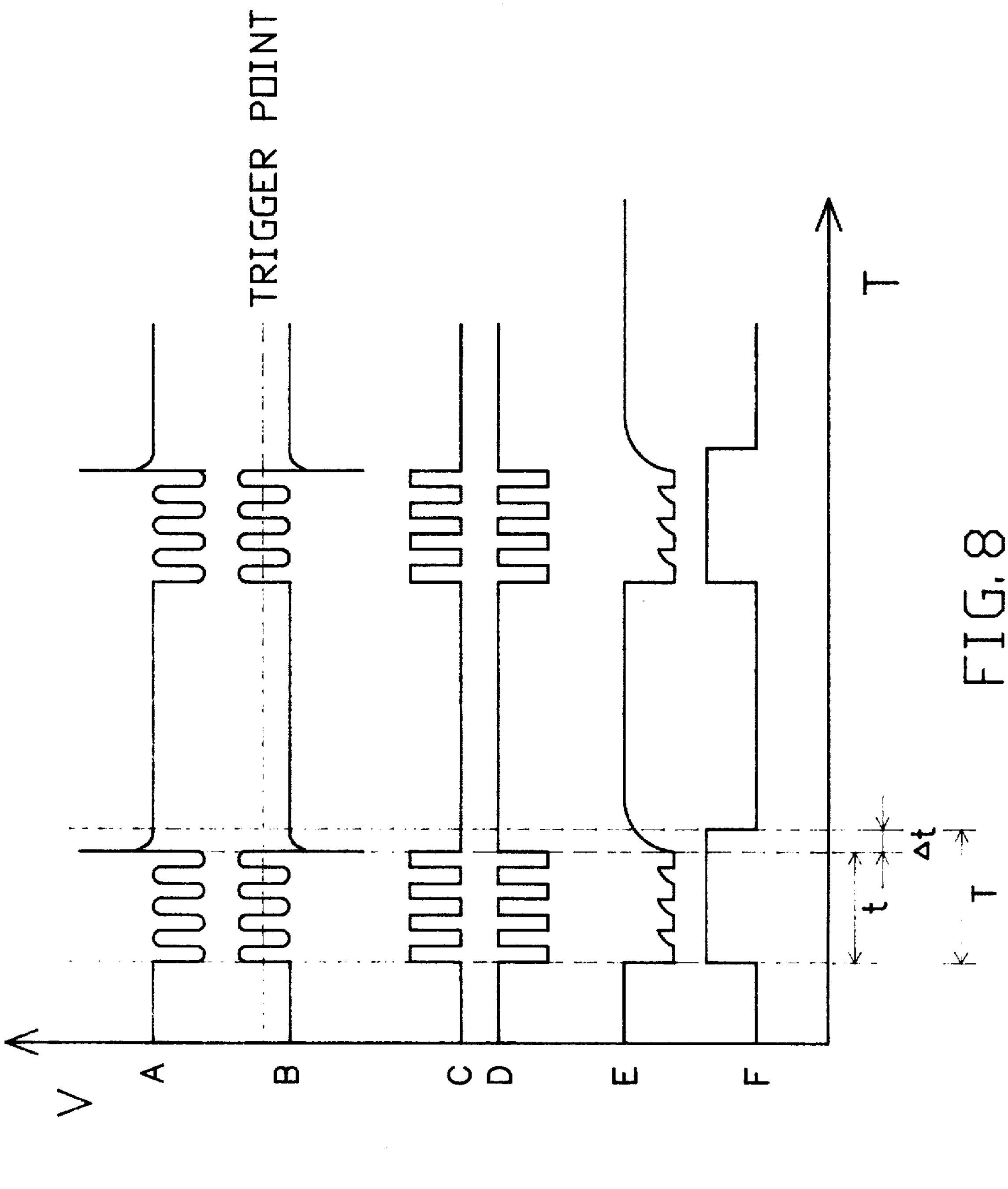
FIG. 8 is the third pattern of fuel injecting of each waveform in FIG. 5.
Figure 9:
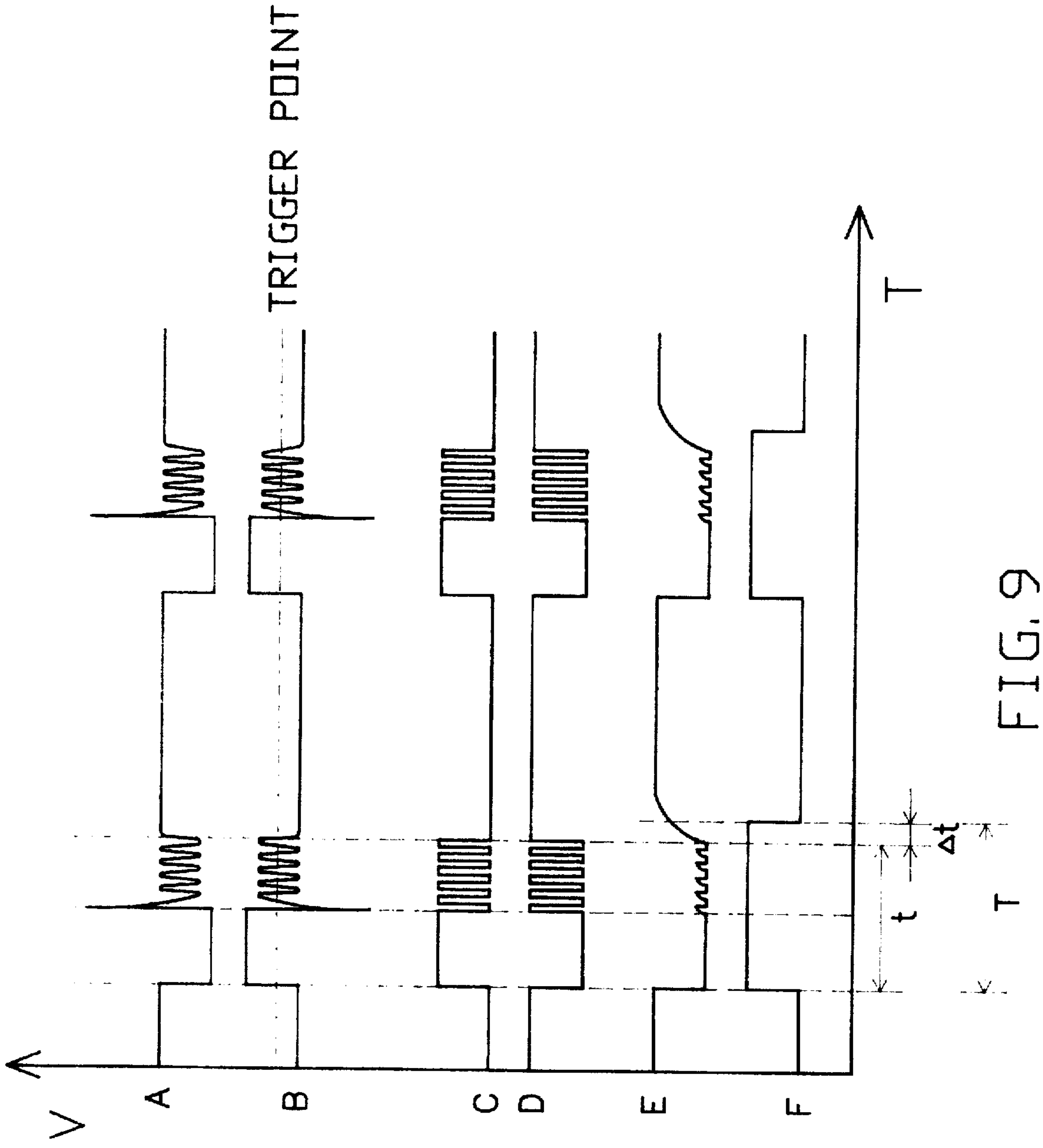
FIG. 9 is the forth pattern of fuel injecting of each waveform in FIG. 5.

Referring to FIG. 5, the signal delay filter 3 comprises an invertor 31 connected to a resistance R3, a capacitor C3, a diode D3 with its output terminal. The output of the delay filter circuit is connected to an invertor 32. The invertors 31, 32 may reverse the waveform. The delay filter circuit is connected to the diode D3 in parallel by the resistance KS, then the capacitor C3 is connected thereafter. This circuit may charge the rising edge of waveform for RC charging while no RC discharge to the falling edge of the waveform. By this arrangement, the interval of positive pulse width can be extended. Then the waveform with the filtered high frequency noise can be sent to the digital signal processor 4 for processing.

FIGS. 6 to 9 show four fuel injecting interval patterns of injector of engine and the variation in each point is shown in the circuit of FIG. 5. Each point in Figures are described as below.

A) Output waveform of fuel injecting interval of engine.

B) A resulted waveform measured by an inverse measure from an output waveform of fuel injecting interval of engine.

C) A waveform can be processed by secondary circuit after it is transformed by the level transformer.

D) A reversed waveform resulted from invertor.

E) The delay filter circuit per-forms RC charge only to the rising edge of waveform and the resulted waveform.

F) A resulted waveform reversed by invertor.

Waveform pulse width T is the summary of the correct t and Δt wherein Δt represents the summary of the RC delay time of the waveform delayed by the delay filter circuit and the delay time generated by its characteristic of the circuit.

Figure 10:
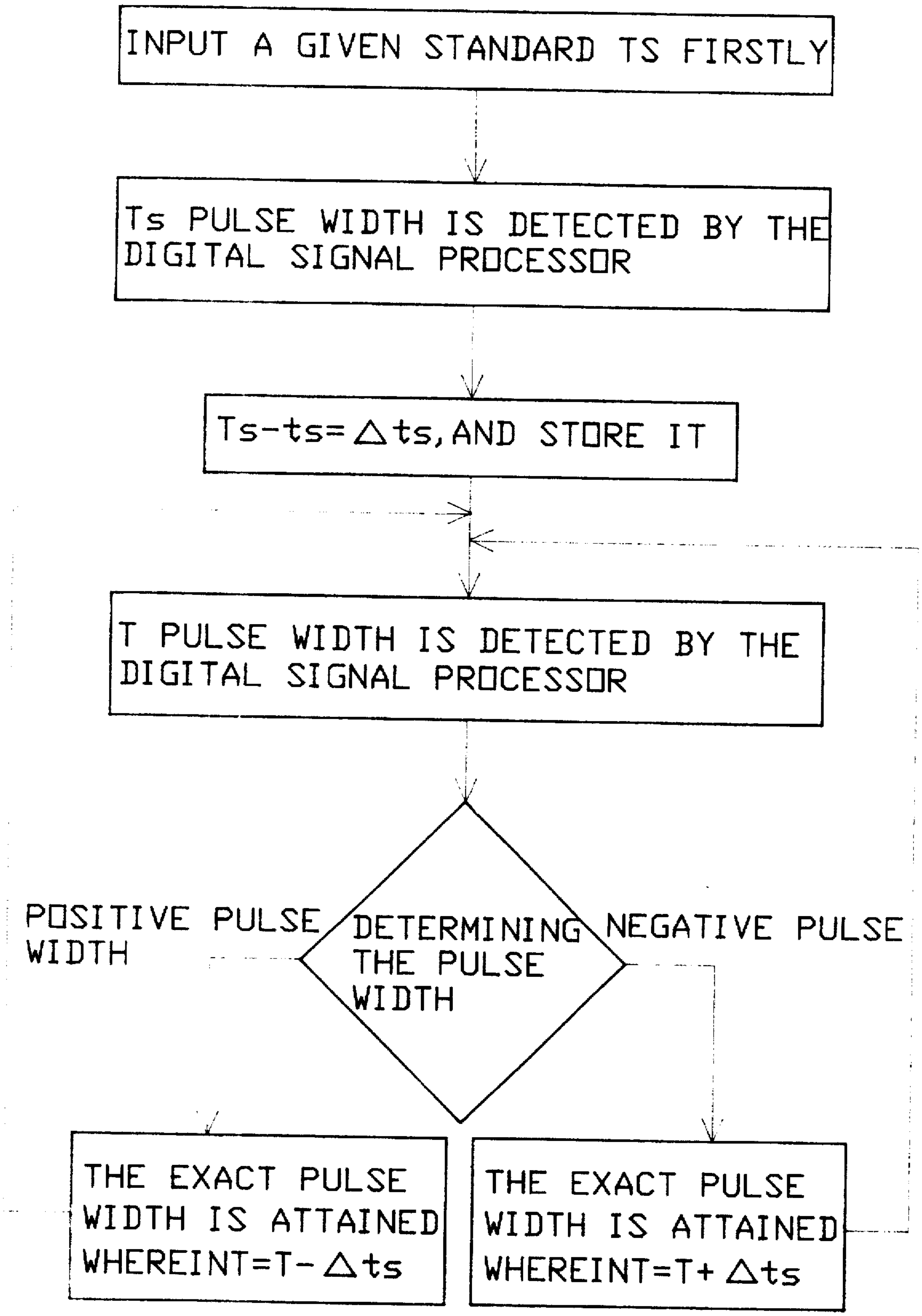
FIG. 10 is schematic illustration of the processing procedure of the digital signal processor.

The correct fuel injecting interval can be calculated by the digital signal processor it with its built-in computing program. The computing procedure is shown in FIG. 10 wherein a given standard pulse width ts is input to the detecting device. Then it is processed by the digital signal processor 4 and a resulted Ts pulse width is attained. Then a delay time Δ ts can be attained by subtract ts with Ts. The Δ ts is then stored in the memory of digital signal processor 4.

When a positive pulse width T is input to the digital signal processor 4 (F point), the positive pulse time can be readily attained by subtract Δ ts with T. When a negative pulse width is input, the negative pulse width can be readily attained by adding T with Δ ts. The measuring error of the detecting device is attained by T subtract Δ ts. By this arrangement, the measuring error and precision will not be effected by the internal components of the detecting device. Accordingly the requirement on precision of the configuring components are not high, while precise measurement can be still attained.

The firevoltage generated by ignition coil of car can reach 10 kV which will cause an interference to the measuring circuit of the common detecting device, accordingly, the results will be negatively effected. The present invention applies a signal delay filter to filter the interference noise. In light of this, the detecting device can be also applied to detect duty cycle, frequency of the dwell of the ignition coil, speed of the engine (RPM) or any other kind of detecting wherein interference exists in the environment.

From the forgoing description, the detecting device made according to this invention is featured with a compact configuration, reduced measuring error, easy to maintain and low service cost which are superior than the conventional detecting device.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

We claim:

1. A device for measuring a fuel injection time interval in an internal combustion engine, comprising:

a level transformer circuit having an input coupled to an output of a fuel injection controller for detecting a signal amplitude greater than a predetermined magnitude to output a target waveform signal;

a signal delay filter having an input coupled to an output of said level transformer circuit for input of said target waveform signal thereto, said signal delay filter including means for extending a duration of positive pulses by a predetermined delay time period to filter high frequency noise from said target waveform signal;

a digital signal processor having an input coupled to an output of said signal delay filter for input of said filtered target waveform signal thereto, said digital signal processor including means for calculating a fuel injection time interval and providing an output of said digital signal processor corresponding to said calculated time interval, said calculating means including means for distinguishing positive pulse durations from negative pulse durations and means for subtracting said predetermined delay time period from said positive pulse durations and adding said predetermined delay time period to said negative pulse durations to accurately measure said fuel injection time interval; and, a display having an input coupled to said output of said digital signal processor for display of said fuel injection time interval.

2. The device as recited in claim 1 where said signal delay filter includes:

a. a first inverter having an input coupled to said output of said level transformer circuit;

b. an RC timing circuit coupled to an output of said first inverter for extending the rise time of a pulse, said RC timing circuit having a diode coupled in parallel relation with a resistor for substantially avoiding extending a fall time of said pulse; and, c. a second inverter having an input coupled to an output of said RC timing circuit and an output coupled to said input of said digital signal processor.

* * * * *